Oct. 11, 1949.  R. A. HEISING  2,484,623
THICKNESS MEASUREMENT
Filed Oct. 17, 1944  2 Sheets-Sheet 1
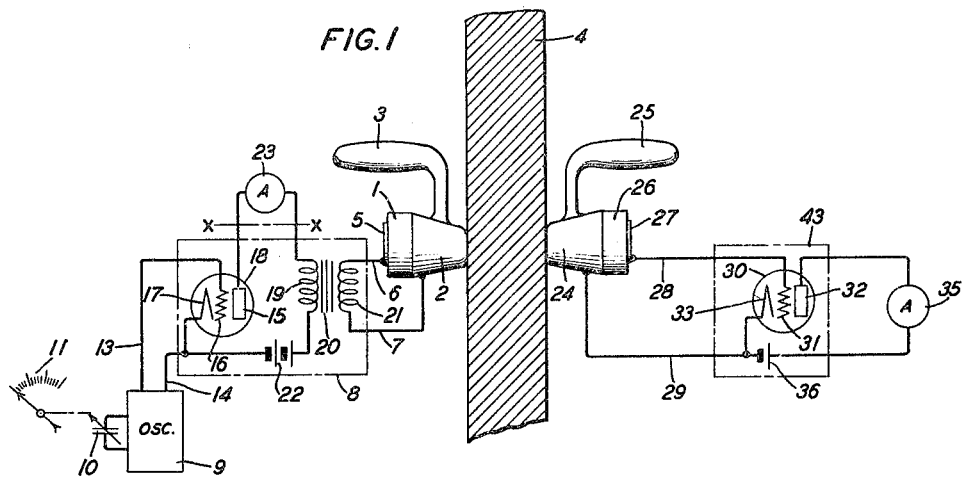
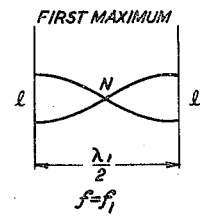
FIG. 2A
FIRST MAXIMUM
$\dfrac{\lambda_1}{2}$
$f=f_1$
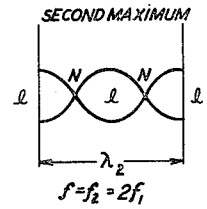
FIG. 2B
SECOND MAXIMUM
$\lambda_2$
$f=f_2=2f_1$
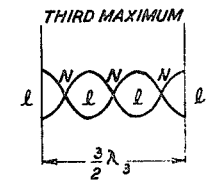
FIG. 2C
THIRD MAXIMUM
$\dfrac{3}{2}\lambda_3$
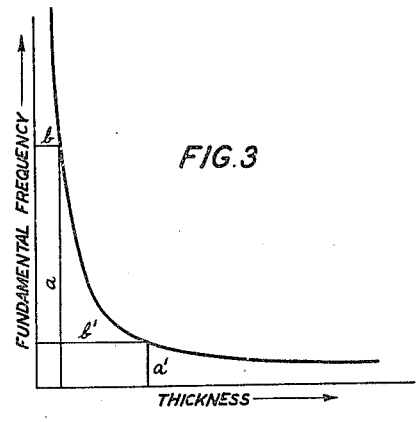
INVENTOR
R. A. HEISING
BY
E. V. Griggs
ATTORNEY Patented Oct. 11, 1949

2,484,623

UNITED STATES PATENT OFFICE 2,484,623

THICKNESS MEASUREMENT

Raymond A. Heising, Summit, N. J., assignor to Bell Telephone Laboratories, Incorporated, New York, N. Y., a corporation of New York Application October 17, 1944, Serial No. 559,097

6 Claims. (Cl. 73—67)

This invention relates in general to the application of compressional vibrations for measuring purposes and in particular to the measurement of thickness by means of ultrasonic vibrations.

In industry, a need has arisen for an accurate method for measuring thicknesses which are inaccessible to the mechanical type gauges conventionally employed. Various prior art methods for accomplishing such measurement have been tried, the most successful of which employs X-rays.

The principal object of this invention is to provide apparatus whereby certain types of compressional wave measurements are made with increased accuracy and facility.

Other objects will be apparent from a study of the specification together with the drawings and claims as hereinafter set forth.

The applicant proposes a device for measuring thicknesses of small-dimensional specimens by means of ultrasonic vibrations which appears to be simpler and more accurate than the devices of the prior art.

Ultrasonic vibrations have been employed heretofore in long range measuring devices such as altimeters and depth sounders. Devices for detecting flaws in construction materials by means of ultrasonic vibrations, such as disclosed in German Patent 569,598 to Mühlhaüser, have recently found industrial application. Another apparatus which utilizes ultrasonic vibrations for measuring purposes is the sonic interferometer developed by G. W. Pierce which is described in the Proceedings of the American Academy of Sciences, vol. 60, page 271, 1925. All of these devices differ from the device disclosed herein by the applicant in several essential respects, the most important being that none of them purport to measure thicknesses of a comparable order of magnitude to those measured by the applicant's device. Furthermore, in the prior art devices mentioned, measurements are made by means of ultrasonic vibrations reflected from a surface presumed to have a relatively high fixed impedance. In the applicant's device, however, measurements are made by virtue of the changes in impedance with frequency of the specimen under study.

The applicant's invention may be briefly described as follows. A means is provided for irradiating a test specimen with a beam of high-frequency compressional vibrations. Whenever the specimen is an integral number of half wavelengths thick for the frequency of the irradiating beam, a resonant response may be detected. In one embodiment of the invention as conceived by the applicant, piezoelectric crystals conventionally mounted between two electrodes, one of which acts as a supporting structure, contact opposite surfaces of a test specimen. Oscillator and amplifier circuits electrically connected to one of the crystals drive it at different desired frequencies of oscillation over a given range. The second crystal is connected to a detecting and amplifying circuit which includes a current indicating device by means of which frequencies producing a resonant response may be determined. Several frequencies giving resonant response may be detected for each specimen, the fundamental frequency determined therefrom, and the corresponding thickness read off of a calibration curve or a calibrated scale on the instrument as described hereinafter.

Referring to the drawings:

Fig. 1 shows a schematic arrangement of one embodiment of the applicant's invention utilizing a driving crystal and a receiving crystal positioned on opposite surfaces of the test specimen, together with the associated oscillating and detecting circuits;

Figs. 2a, b and c are diagrams illustrating the theory of standing waves set up in the test specimen according to the applicant's supersonic testing method;

Fig. 3 shows a calibration curve of a type that may be used in conjunction with the applicant's testing apparatus;

Figure 4:
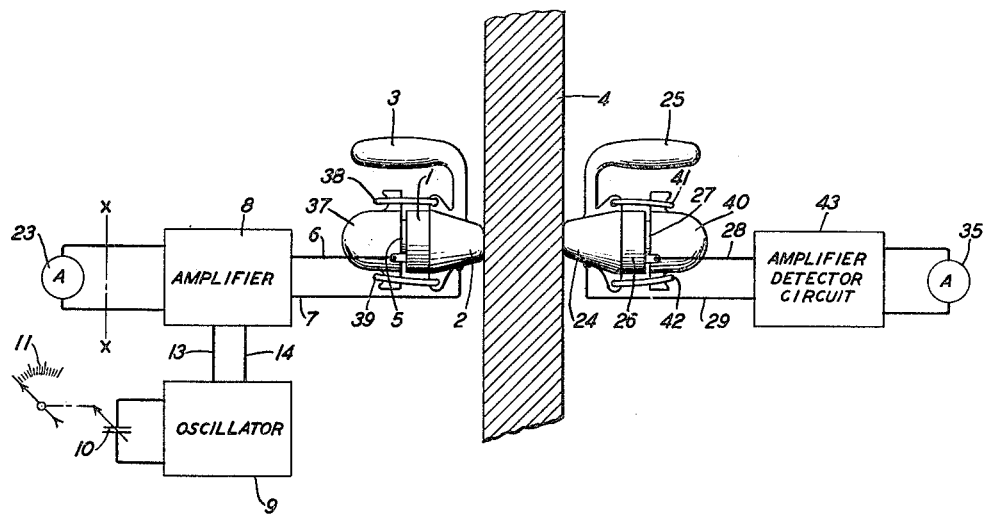
Fig. 4 shows an improvement of the embodiment disclosed in Fig. 1 in which the crystal oscillations are damped.

The applicant's method of measuring thickness by means of ultrasonic vibrations may be better understood by studying one embodiment of the invention as illustrated in Fig. 1 of the drawings. The crystal 1, which may be a single crystal, or a bank of several crystals cemented together, may be of any type well known in the art possessing piezoelectric properties and which can be excited to a longitudinal mode of vibration. For the purposes of the embodiment shown, the applicant has employed a 45-degree Z-cut crystal of ammonium dihydrogen phosphate which has a high piezoelectric constant and therefore produces vibration of relatively greater intensity than other well-known piezoelectric crystals. This is so mounted that a metal electrode 2 in contact with one of the crystal surfaces serves to support the crystal assemblage in contact with the test specimen 4. The electrode 2 is preferably of such a shape as to make maximum contact with the test surface, thereby producing vibrations in the test medium. A handle 3 attached to the supporting electrode 2 enables the crystal assemblage to be held in the desired position on the surface of the test specimen which is presumably some small dimensional part the thickness of which is to be measured. Although some damping action to the crystal vibrations occurs when a person seizes the handle 3, this is relatively small, and may therefore be neglected. Gold plating on the opposite crystal face serves as the second electrode 5.

By means of leads 6 and 7, the crystal assemblage is coupled to the circuit of the transformer-coupled amplifier 8. Oscillations are fed onto the grid 16 of the triode 18 in the circuit of the amplifier 8 from a variable frequency oscillator 9 which may be of any type known in the art, and the frequency of which is preferably controlled by means of a variable condenser 10 which may operate on a calibrated scale 11. In the usual manner, oscillations in the potential of the grid 16 produce corresponding oscillations in the plate current which passes from the power source 22 through the primary winding 19 of the transformer 20, to the plate 15, and hence to the filament 17 of the triode 18. A corresponding E. M. F. is accordingly induced in the secondary winding 21 of the transformer 20, and conducted by means of leads 6 and 7 to the electrodes 5 and 2, whereby piezoelectric oscillations are induced in the crystal 1 and transmitted to the test specimen 4, setting up compressional vibrations therein.

It is possible to make thickness measurements according to the applicant's method using the above described device alone positioned only on one surface of the test specimen. In such case, the current indicating device 23 which is preferably a milliammeter would be included in the circuit of the amplifier 8 as shown above the line x—x. Resonant response of the test specimen 4 to changes in the frequency of the impressed vibrations as explained hereinafter causes changes in the impedance of the crystal assemblage which react on the plate circuit of the amplifier 8 through the transformer 20 causing a changed response in the current indicating device 23. However, more satisfactory determination may be made by positioning a detecting circuit on the opposite surface of the test specimen 4.

In the embodiment shown in Fig. 1, the detecting apparatus positioned on the second or remote surface of the test specimen includes a crystal assemblage similar to that attached to the primary unit and described hereinbefore, which comprises a piezoelectric crystal 26 positioned between electrodes 24 and 27, and held in contact with the test specimen by means of the handle 25. The crystal assemblage is connected by means of conductors 28 and 29 to the circuit of the detector 43. As will be described hereinafter, changes in the frequency of the oscillations impressed upon the test specimen 4 cause corresponding changes in the impedance of the vibrating system depending on whether or not the thickness of a given specimen is resonant for a given impressed frequency. The resulting fluctuations in potential are fed onto the grid 31 of the tube 30, thereby causing corresponding fluctuation in the plate current which passes from the power source 36 through the current indicating device 35, to the plate 32, and hence to the filament 33 of the tube 30. Sharp changes in the response of the current indicating device 35, which is preferably some type of milliammeter, indicate resonant frequencies.

Figure 5:
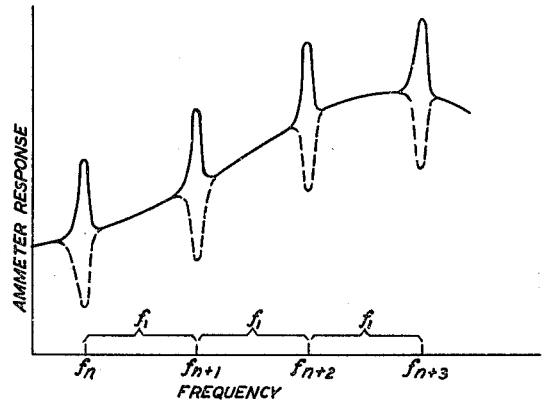
Fig. 5 shows the changes in ammeter response with frequency.

The theory of operation of the apparatus of Fig. 1 may be better understood by reference to the diagrams of Figs. 2a, b, and c. When the piezoelectric crystal 1 of Fig. 1 is driven at a given frequency by means of the oscillator 9, high frequency compressional vibrations are caused to be set up in the test specimen 4. If the thickness of the test specimen is an integral number of half wavelengths in accordance with the frequency of the induced vibrations, standing waves are set up in the test specimen, producing a change in the impedance thereof which causes a resonant response in the indicating device 23 which is preferably some type of ammeter. This response in the current indicating device may be either positive or negative, as shown in Fig. 5, depending on how the circuits are coupled and whether a crystal unit is used on one or both surfaces of the test specimen.

Assume that the frequency of the driving oscillator 9 is progresively varied over a given range, and that the frequency $f_1$ is found to be the lowest frequency which produces a resonant response in the current indicator 23 for a test specimen of thickness $t$. As shown schematically in Fig. 2a, standing waves will be set up in which there will be loops, or planes of maximum particle velocity, at the two outer surfaces of the test specimen, and a single node, or plane of minimum particle velocity, midway between the two surfaces. $f_1$ is then designated as the "fundamental" frequency of vibration for a particular specimen thickness $t$ under discussion and may be defined as the lowest frequency for which standing waves will be set up. The thickness $t$ of the test specimen is then equal to $\lambda_1/2$ where $\lambda_1$ represents the wavelength of the compressional vibrations corresponding to the frequency $f_1$ in the test medium. Inasmuch as the waves are compressional, it is to be understood that the motion of the vibrating particles takes place in the direction of wave propagation, i. e. transverse to the plane of test specimen 4.

Supposing that the driving frequency of the oscillator 9 is progressively increased to a frequency $f_2$ which is twice the fundamental frequency. As the frequency departs from $f_1$ the current response will gradually return to normal but will later begin to change again giving a resonant current response in the current indicating device 23 at the frequency $f_2$. In this second case the standing waves set up in the test specimen will assume a mode of vibration such as indicated schematically in Fig. 2b in which loops appear at the two outer surfaces and two nodal planes appear intermediate. The wavelengths of the vibrations in the test medium corresponding to the frequency $f_2$ will be designated as $\lambda_2$ where $\lambda_2$ is equal to the thickness of the test specimen. Similarly, if the driving frequency is increased to a value $f_3$ which is three times the fundamental frequency, three nodal planes will appear, and the specimen thickness will be equal to $3/2\lambda_3$. It is obvious from the foregoing that as the frequency is progressively increased, there is a resonant response in the case of every frequency for which the thickness of the specimen is equal to an integral number of half wavelengths for the vibrations in the test medium.

From the above, it follows that for a specimen of given thickness, the difference between any two successive resonant frequencies will give the fundamental frequency $f_1$ for a particular medium or material of which the specimen consists.

The fundamental equation for the velocity V of compressional vibrations in a medium may be stated as follows:

$$V=\sqrt{\frac{k}{d}}=f\lambda=f_1(2t)$$

where $k$ equals the elastic constant of the medium, $d$ equals the density of a given medium, $f=$ frequency and $\lambda=$ wavelength of the vibrations in the given medium. From this relationship, it is seen that the product of the fundamental frequency $f_1$ and the specimen thickness $t$ is equal to a constant $$\tfrac{1}{2}\sqrt{\frac{k}{d}}$$

which may be designated as K. In plotting the relationship, $$f_1 t = K$$

a hyperbola is obtained. It is thus seen that if for one particular material such as steel, the thicknesses of a series of test specimens are plotted along the abscissa while the corresponding fundamental frequencies determined in each case are plotted along the ordinate, a hyperbolic calibration curve is obtained such as indicated in Fig. 3 of the drawings. A separate calibration curve must be drawn up for each different material of the specimens to be measured.

Utilizing the applicant's method, the thickness of a test specimen may be determined in the following manner. The driving frequency of the oscillator 9 is progressively varied over a given range in such a manner as to detect a number of consecutive resonant frequencies. Fig. 5 shows a typical curve representing variation in ammeter response with frequency for a specimen of given material and thickness. As stated above, the resonant responses may be either positive or negative depending on how the circuits are coupled. Since it is somewhat difficult to determine the particular harmonic of the fundamental frequency corresponding to each point of current resonance, the resonant frequencies have been designated as $f_n$, $f_{n+1}$, $f_{n+2}$, etc. The numerical difference between each two consecutive resonant frequencies, such as $f_{n+1}-f_n$ represents the fundamental frequency for the specimen of given thickness and material under test. By taking an average of several of these differences, the fundamental frequency $f_1$ for the particular specimen under test may be accurately determined. The thickness of the specimen may then be read off of a calibration curve such as shown in Fig. 3. For instance, if the fundamental frequency $f_1$ for a given specimen is represented by $a$ cycles per second, the corresponding thickness of the specimen may be determined from the curve to be $b$ centimeter, while a fundamental frequency $f_1$ of $a'$ for a different specimen corresponds to a thickness of $b'$ centimeter for that specimen.

For the measurement of a large number of test parts of the same material where only a slight discrepancy exists between the thicknesses of any two specimens, it is possible to calibrate the instrument so that thicknesses may be read off directly. One method of accomplishing this is by attaching a scale 11 calibrated to read in terms of thickness to the variable condenser 10 which is connected to the oscillator 9.

As the frequency of the oscillator 9 is progressively varied over a wide range, there will be observed, in addition to the recurring resonant responses for those frequencies for which the specimen 4 is an integral number of half wavelengths thick, a resonance effect which depends on the vibrational characteristics of the crystal itself. This is seen by reference to Fig. 5 of the drawings. The crystals employed in the measuring instrument are preferably chosen so that their natural resonant frequencies are slightly higher than the mean resonant frequencies to be measured.

If the natural resonant reaction of the crystal to frequency changes is not too sharp, the embodiment of the applicant's device as shown in Fig. 1 will operate satisfactorily. The changes in current response with frequency will be substantially as shown in Fig. 5. In most cases, however, it is desirable to have the crystal vibrations critically damped, thereby flattening out the natural resonant response of the crystal to changes in frequency.

In Fig. 4 of the drawing, the applicant illustrates one method of achieving this damping or flattening of the natural resonance response of the crystal 1 by attaching thereto a damping member which may be a block 37 of any suitable plastic material known in the art such as polystyrene, preferably two or three times as thick as the crystal 1. Clamps 38 and 39 hold the crystal 1, one surface of which is covered by the gold-plate electrode 5, in position between the damping member 37 and the supporting electrode 2. A similar damping member 40 is clamped to the crystal 26 by means of clamps 41 and 42 in the detector assemblage on the opposite side of the test specimen 4. Numerous other methods of damping the natural oscillations of the crystal are known to the art and may be employed for the purposes of this invention.

The system for thickness measurement as conceived by the applicant is not to be construed as limited to the particular embodiments disclosed herein, or to the use of any particular piece of apparatus shown by way of illustration in the specification and drawings.

What is claimed is:

1. A thickness gauge for small dimensional parts which comprises in combination a first piezoelectric crystal element, two electrodes attached to opposite faces thereof, one said electrode functioning as a support in contact with one surface of a test part, a handle attached to said supporting electrode, an oscillator, means for progressively varying the frequency thereof, an amplifier, said oscillator and amplifier electrically connected through said electrodes to drive said first crystal element at a desired frequency of oscillation, a second piezoelectric crystal element, two electrodes attached to opposite faces thereof, one said electrode functioning as a support in contact with an opposing surface of said test part, a handle attached to the last said supporting electrode, and a detector circuit including a current indicating device connected to said second crystal element through said electrodes.

2. A thickness gauge for small dimensional parts which comprises in combination a first piezoelectric crystal element, two electrodes attached to opposite faces thereof, one said electrode functioning as a support in contact with one surface of a test part, a handle attached to said supporting electrode, a damping member mechanically coupled to said first piezoelectric crystal element, an oscillator, means for progressively varying the frequency thereof, an amplifier, said oscillator and amplifier electrically connected through said electrodes to drive said first crystal element at a desired frequency of oscillation, a second piezoelectric crystal element, two electrodes attached to opposite faces thereof, one said electrode functioning as a support in contact with an opposing surface of said test part, a handle attached to the last said supporting electrode, a damping member mechanically coupled to said second piezoelectric crystal element, and a detector circuit including a current indicating device electrically connected to said second crystal element through said electrodes.

3. A thickness gauge for small dimensional parts which comprises in combination a piezoelectric crystal element, two electrodes attached to opposite faces thereof, one said electrode functioning as a support in contact with one surface of a test part, an oscillator, means for progressively varying the frequency thereof, amplifying and detecting means, said oscillator, amplifying and detecting means electrically connected to said crystal element through said electrodes, and current indicating means electrically connected to said detecting means.

4. A thickness gauge for small dimensional parts which comprises in combination a piezoelectric crystal element, electrodes attached to opposite faces thereof, one said electrode functioning as a support in contact with one surface of a test part, a damping member mechanically coupled to said piezoelectric crystal element, an oscillator, means for progressively varying the frequency thereof, amplifying and detecting means, said oscillator, amplifying and detecting means electrically connected to said crystal element through said electrodes, and current indicating means electrically connected to said detecting means.

5. A thickness gauge which comprises in combination a first piezoelectric crystal element positioned to induce compressional vibrations in a test element, two electrodes attached to opposite faces thereof, an oscillator, means for progressively varying the frequency thereof, said oscillator electrically connected through said electrodes to drive said first crystal element at a desired frequency of oscillation, a second piezoelectric crystal element responsive to the vibrations in said test element, two electrodes attached to opposite faces thereof, and a detector circuit including a current indicating device connected to said second crystal through said electrodes.

6. A thickness gauge which comprises in combination a first piezoelectric crystal element positioned to induce compressional vibrations in a test element, two electrodes attached to opposite faces thereof, a damping member mechanically coupled to said first piezoelectric crystal element, an oscillator, means for progressively varying the frequency thereof, said oscillator electrically connected through said electrodes to drive said first crystal element at a desired frequency of oscillation, a second piezoelectric crystal element responsive to the vibrations in said test element, two electrodes attached to opposite faces thereof, a damping member mechanically coupled to said second piezoelectric crystal element, and a detector circuit including a current indicating device electrically connected to said second crystal element through said electrodes.

RAYMOND A. HEISING.

REFERENCES CITED

The following references are of record in the file of this patent:

UNITED STATES PATENTS

| Number | Name | Date |
|---|---|---|
| 1,414,077 | Fessenden | Apr. 25, 1922 |
| 1,543,124 | Ricker | June 23, 1925 |
| 1,980,171 | Amy | Nov. 13, 1934 |
| 1,990,085 | Mudge et al. | Feb. 5, 1935 |
| 2,105,479 | Hayes | Jan. 18, 1938 |
| 2,164,125 | Sokoloff | June 27, 1939 |
| 2,280,226 | Firestone | Apr. 21, 1942 |
| 2,431,233 | Erwin | Nov. 18, 1947 |
| 2,433,963 | Tarbox | Jan. 6, 1948 |
| 2,439,131 | Firestone | Apr. 6, 1948 |

FOREIGN PATENTS

| Number | Country | Date |
|---|---|---|
| 265,181 | Great Britain | Jan. 26, 1928 |
| 569,598 | Germany | Feb. 4, 1933 |

OTHER REFERENCES

"Supersonics at Work," article by Keith Henney in The Scientific American, July 1944, pages 10, 11 and 12.